United States Patent
Hanaoka

(10) Patent No.: US 12,381,437 B2
(45) Date of Patent: Aug. 5, 2025

(54) DRIVE UNIT FOR IMPROVING WATERPROOF PERFORMANCE OF A CONNECTOR

(71) Applicant: HONDA MOTOR CO., LTD., Tokyo (JP)

(72) Inventor: Daisuke Hanaoka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 257 days.

(21) Appl. No.: 18/133,756

(22) Filed: Apr. 12, 2023

(65) Prior Publication Data
US 2023/0353005 A1 Nov. 2, 2023

(30) Foreign Application Priority Data

Apr. 28, 2022 (JP) .................................. 2022-075373

(51) Int. Cl.
H02K 5/10 (2006.01)
H02K 5/22 (2006.01)
H02K 11/33 (2016.01)

(52) U.S. Cl.
CPC .............. H02K 5/10 (2013.01); H02K 5/225 (2013.01); H02K 11/33 (2016.01)

(58) Field of Classification Search
CPC ............ H02K 5/10; H02K 5/22; H02K 5/225; H02K 11/30; H02K 11/33; H01R 13/5227
See application file for complete search history.

(56) References Cited

U.S. PATENT DOCUMENTS

| | | | |
|---|---|---|---|
| 2012/0003856 A1* | 1/2012 | Yamaguchi | H01R 13/5202 439/271 |
| 2012/0319513 A1* | 12/2012 | Okamoto | H02K 3/28 310/71 |
| 2016/0308299 A1* | 10/2016 | Mukuno | H01R 13/5219 |
| 2019/0334283 A1* | 10/2019 | Di Paola | F04B 19/04 |
| 2020/0358333 A1 | 11/2020 | Wakabayashi et al. | |
| 2023/0307984 A1* | 9/2023 | Dojiri | H02K 11/33 |

FOREIGN PATENT DOCUMENTS

JP 2020-184865 A 11/2020
JP 2021-125902 A 8/2021

OTHER PUBLICATIONS

Sep. 5, 2023, translation of Japanese Office Action issued for related JP Application No. 2022-075373.

* cited by examiner

*Primary Examiner* — Eric Johnson
(74) *Attorney, Agent, or Firm* — Paratus Law Group, PLLC

(57) ABSTRACT

A drive unit includes first and second rotary electric machines, a first housing that houses the first and second rotary electric machines, a PCU that controls the first rotary electric machine and the second rotary electric machine, and a connector that has a connector terminal for electrically connecting the first and second rotary electric machines and the PCU, and that is fixed to an upper surface of the first housing. The connector includes a base portion that is fixed to the upper surface of the first housing, the connector terminal that is provided at the base portion, an upper seal groove that is provided in the base portion so as to surround the connector terminal and in which a seal member is disposed, and a discharge portion that communicates with the upper seal groove and from which a liquid flowing along the upper seal groove is discharged.

7 Claims, 7 Drawing Sheets

DRIVE UNIT FOR IMPROVING WATERPROOF PERFORMANCE OF A CONNECTOR

CROSS-REFERENCE TO RELATED APPLICATIONS

The present application claims the benefit of priority of Japanese Patent Application No. 2022-075373, filed on Apr. 28, 2022, the content of which is incorporated herein by reference.

TECHNICAL FIELD

The present invention relates to a drive unit to be mounted on an electric vehicle or the like.

BACKGROUND ART

In recent years, efforts for realizing a low-carbon society or a decarburized society have been actively made. For vehicles, in order to reduce $CO_2$ emissions and improve energy efficiency, research and development regarding electric vehicle have been conducted.

A drive unit is mounted on an electric vehicle. For example, a drive unit disclosed in JP2020-184865A includes a generator capable of generating electric power by using power from an engine, an electric motor for driving wheels, and an electric-power control device for controlling the generator and the electric motor. A rotary electric machine such as a generator or an electric motor is electrically connected to the electric-power control device via a connector.

SUMMARY OF INVENTION

When a liquid such as rainwater enters the connector of the drive unit, a short circuit is caused, which leads to a failure. In view of this, the connector is provided with a sealing structure to be waterproof. However, depending on a mounting position and a mounting direction of the connector, the liquid may accumulate on a sealing surface or the like of the connector. If the waterproof performance is insufficient, rust may be induced, and a sealing function of the sealing structure for the connector may be degraded or fixing of the connector may not be sufficiently secured.

The present embodiment provides a drive unit capable of improving waterproof performance of a connector. Further, the present embodiment contributes to improvement in energy efficiency.

The present embodiment provides a drive unit including:
a rotary electric machine;
a first housing that houses the rotary electric machine,
an electric-power control device that controls the rotary electric machine;
a second housing that is attached to an upper surface of the first housing and houses the electric-power control device; and
a connector that has a connector terminal for electrically connecting the rotary electric machine and the electric-power control device, and that is fixed to the upper surface of the first housing.
The connector includes
a base portion that is fixed to the upper surface of the first housing,
the connector terminal that is provided at the base portion;
a seal groove that is provided in the base portion so as to surround the connector terminal and in which a seal member is disposed, and
a discharge portion that communicates with the seal groove and from which a liquid flowing along the seal groove is discharged.

According to the present embodiment, waterproof performance of a connector can be improved.

DESCRIPTION OF EMBODIMENTS

Figure 1:
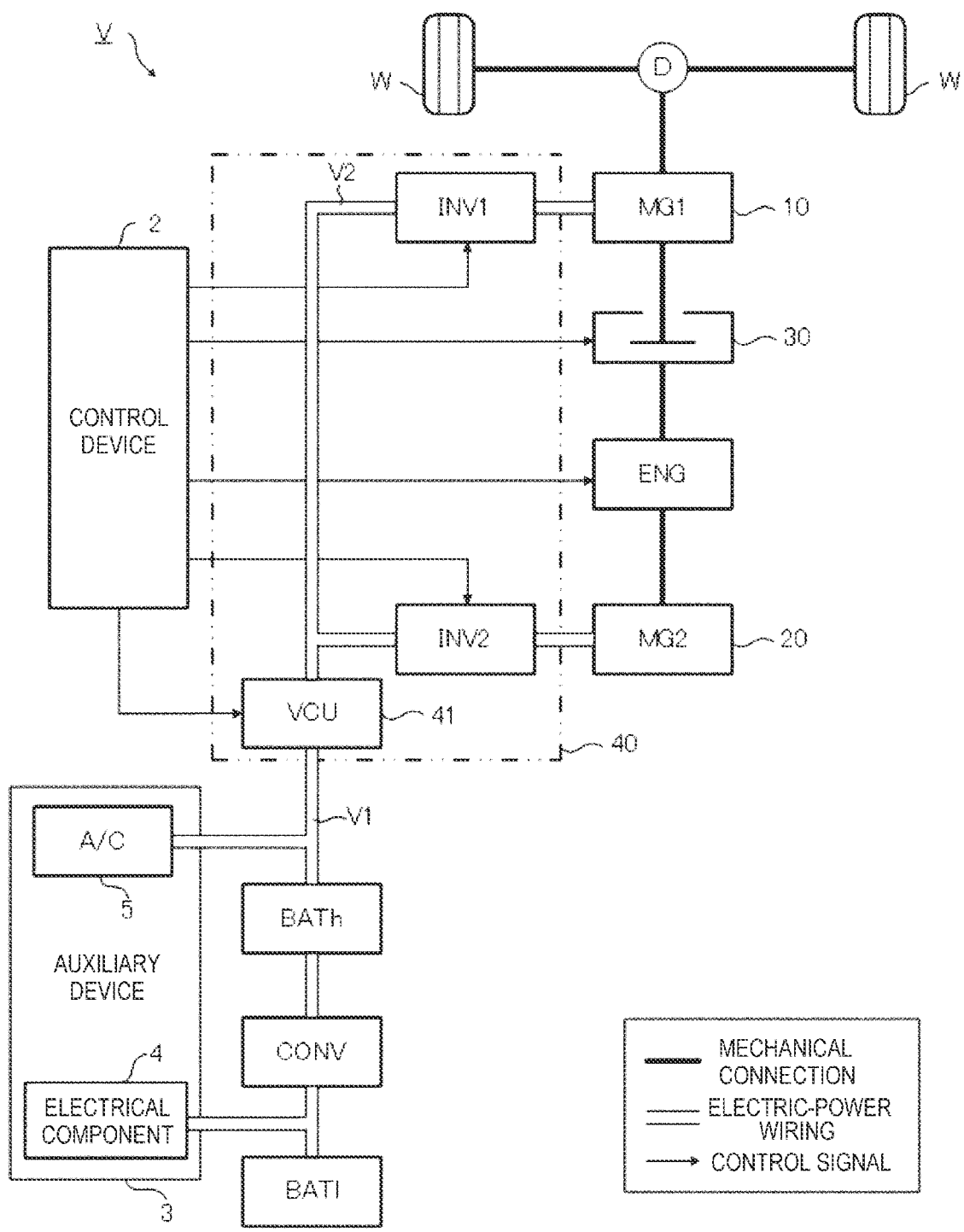
FIG. 1 is a block diagram illustrating a power system of a hybrid vehicle V on which a drive unit 1 according to an embodiment of the present invention is mounted.

Hereinafter, an embodiment of an electric vehicle on which a drive unit of the present invention is mounted will be described with reference to the accompanying drawings. In the present embodiment, the electric vehicle is exemplified as a hybrid vehicle. In the drawings, reference signs Fr, Rr, L, U, and D indicate a front side, a rear side, a left side, a right side, an upper side, and a lower side, respectively, in accordance with directions viewed from a driver of the hybrid vehicle.

Hybrid Vehicle

Figure 2:
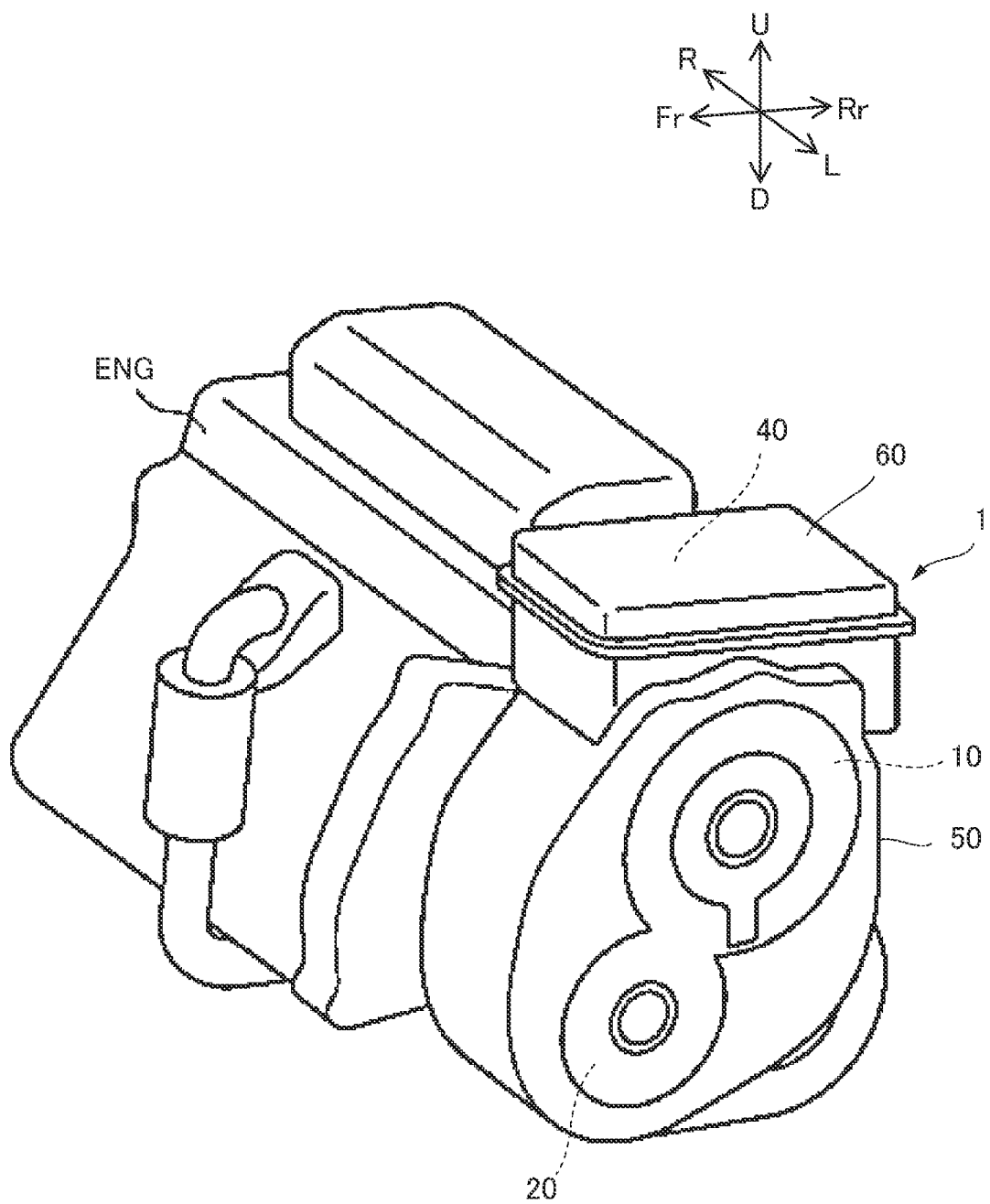
FIG. 2 is a perspective view of the drive unit 1 to which an engine ENG is connected.

As illustrated in FIGS. 1 and 2, a hybrid vehicle V basically includes an engine ENG, a drive unit 1, a control device 2, and an auxiliary device 3. The engine ENG and the drive unit 1 are disposed, for example, in an engine room at a front portion of the vehicle. In FIG. 1, a thick solid line indicates mechanical connection, a double solid line indicates electric-power wiring, and a thin solid line indicates a control signal.

The drive unit 1 includes a first rotary electric machine 10 and a second rotary electric machine 20 that are rotary electric machines having a vector controlled three-phase embedded magnet structure, a driving force transmission state switching unit 30, a speed reducer D, and an electric-power control unit (hereinafter, also referred to as PCU) 40. The first rotary electric machine 10 and the second rotary electric machine 20 are motor generators, and are indicated as MG1 and MG2 in FIG. 1. The PCU 40 includes a voltage control unit (hereinafter, also referred to as VCU) 41, a first inverter INV1, and a second inverter INV2, and controls the first rotary electric machine 10 and the second rotary electric machine 20.

The driving force transmission state switching unit 30 includes a clutch (not illustrated) that directly couples the engine ENG to the speed reducer D, and a transmission or a fixed gear stage interposed between the clutch and the speed reducer D.

The engine ENG drives the second rotary electric machine 20 as a generator. In this case, the second rotary electric machine 20 is driven by rotational power of the engine ENG to generate electric power.

In addition, the engine ENG may be driven by the second rotary electric machine 20 that operates as an electric motor during braking of the hybrid vehicle V, and function as a mechanical load in which a crankshaft rotates in an idling state.

The first rotary electric machine 10 for driving the hybrid vehicle V operates (power running) as an electric motor by electric power supply from at least one of a high-voltage battery BATh and the second rotary electric machine 20, and generates a torque for running the hybrid vehicle V The torque generated by the first rotary electric machine 10 is transmitted as a driving force to the wheels W via the speed reducer D. The first rotary electric machine 10 operates as a generator during braking of the hybrid vehicle V.

The high-voltage battery BATh includes a plurality of electric-power storage cells connected in series, and supplies a high voltage of 100 [V] to 300 [V], for example. The electric-power storage cell is, for example, a cell of a lithium-ion battery or a nickel-hydrogen battery. The high-voltage battery BATh may be a capacitor.

A low-voltage battery BAT1 stores a voltage stepped down by a converter CONV, supplies a constant voltage of, for example, 12 [V] to an electrical component 4 such as a light provided in the auxiliary device 3, and is set as a DC power source of the control device and the like. The converter CONV is a DC/DC converter that steps down a DC output voltage of the high-voltage battery BATh in a DC state.

The VCU 41 steps up a voltage V1 that is an output voltage of the high-voltage battery BATh to a voltage V2 that is an input voltage for the first rotary electric machine 10 at the time when the first rotary electric machine 10 operates as an electric motor.

The VCU 41 steps down the voltage V2, which is an output voltage of the first rotary electric machine 10 at the time when the first rotary electric machine 10 operates as a generator during braking of the hybrid vehicle V, to the voltage V1.

Further, the VCU 41 steps down the voltage V2, which is generated by the second rotary electric machine 20 by driving of the engine ENG and converted into a direct current, to the voltage V1.

That is, the VCU 41 functions as a step-up/step-down converter (bidirectional voltage converter) between the high-voltage battery BATh and the first rotary electric machine 10 and the second rotary electric machine 20.

Electric power at a voltage stepped down by the VCU 41 is supplied as electric power for driving an electric air compressor (A/C) 5 provided in the auxiliary device 3 and/or electric power for charging the high-voltage battery BATh.

The first inverter INV1 converts the voltage V2 into an AC voltage and supplies a three-phase current to the first rotary electric machine 10 (power running). Further, the first inverter INV1 converts an AC voltage generated by the first rotary electric machine 10 during braking of the hybrid vehicle V into the voltage V2 (regeneration).

The second inverter INV2 converts an AC voltage generated by the second rotary electric machine 20 by driving of the engine ENG into the voltage V2 that is a DC voltage. In addition, the second inverter INV2 may convert the voltage V2, which is converted by the first inverter INV1 after being generated by the first rotary electric machine 10 during braking of the hybrid vehicle V, into an AC voltage, and supply a three-phase current to the second rotary electric machine 20.

The control device 2 performs vector control including the first inverter INV1, the first rotary electric machine 10, the second inverter INV2, the second rotary electric machine 20, and the VCU 41, and performs control on the engine ENG, the driving force transmission state switching unit 30, and the auxiliary device 3.

In the hybrid vehicle V, the driving force transmission state switching unit 30 and the mechanical connection extending from the driving force transmission state switching unit 30 to both sides are used only when the wheels W are driven via the speed reducer D through the driving force transmission state switching unit 30 with the engine ENG as a power source. At the time of acceleration, the engine ENG and the first rotary electric machine 10 may be used.

Drive Unit

Figure 3:
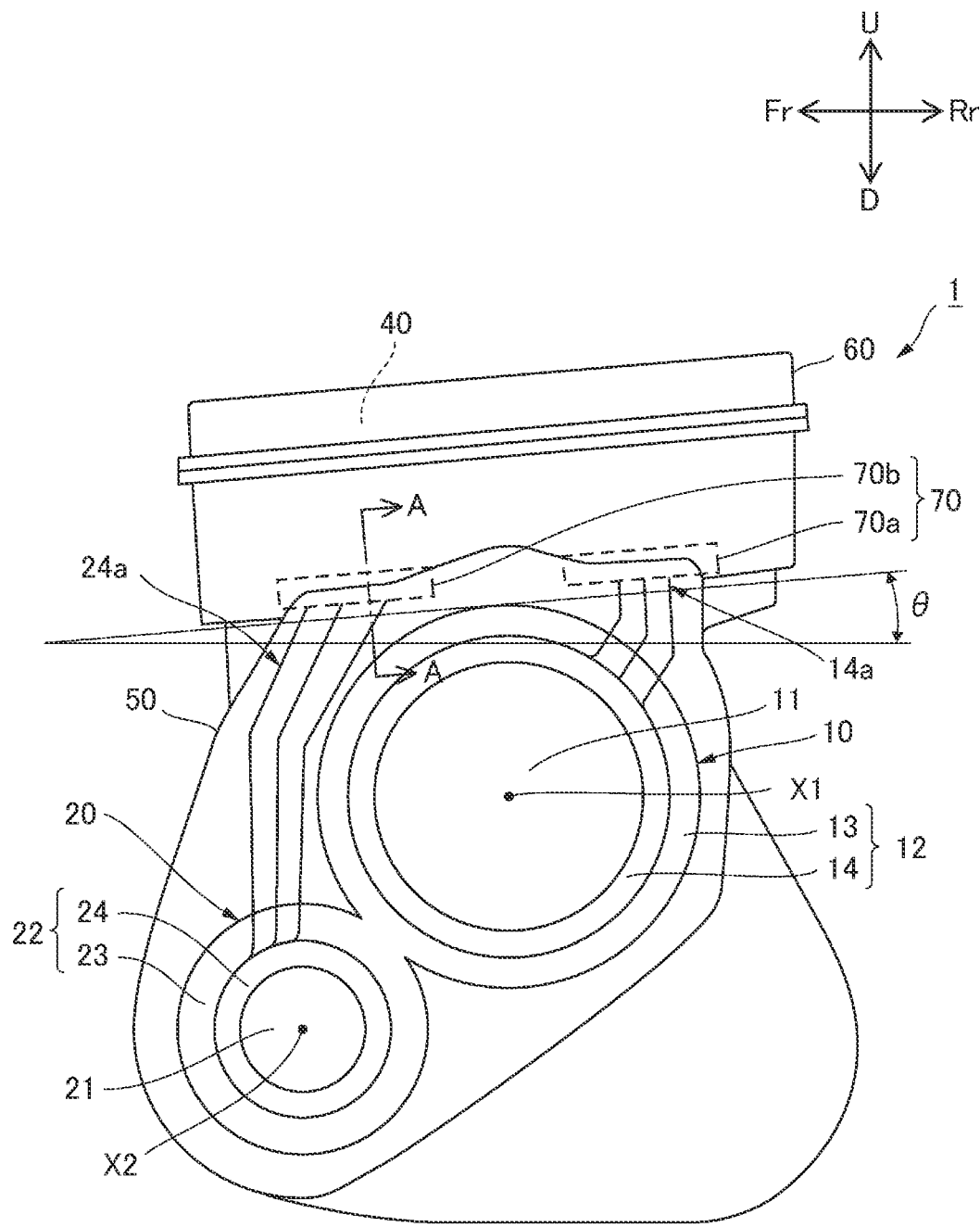
FIG. 3 is a cross-sectional view of a main part of an inner portion of a rotary electric machine housing 50 of the drive unit 1 as viewed from a left side.
Figure 4:
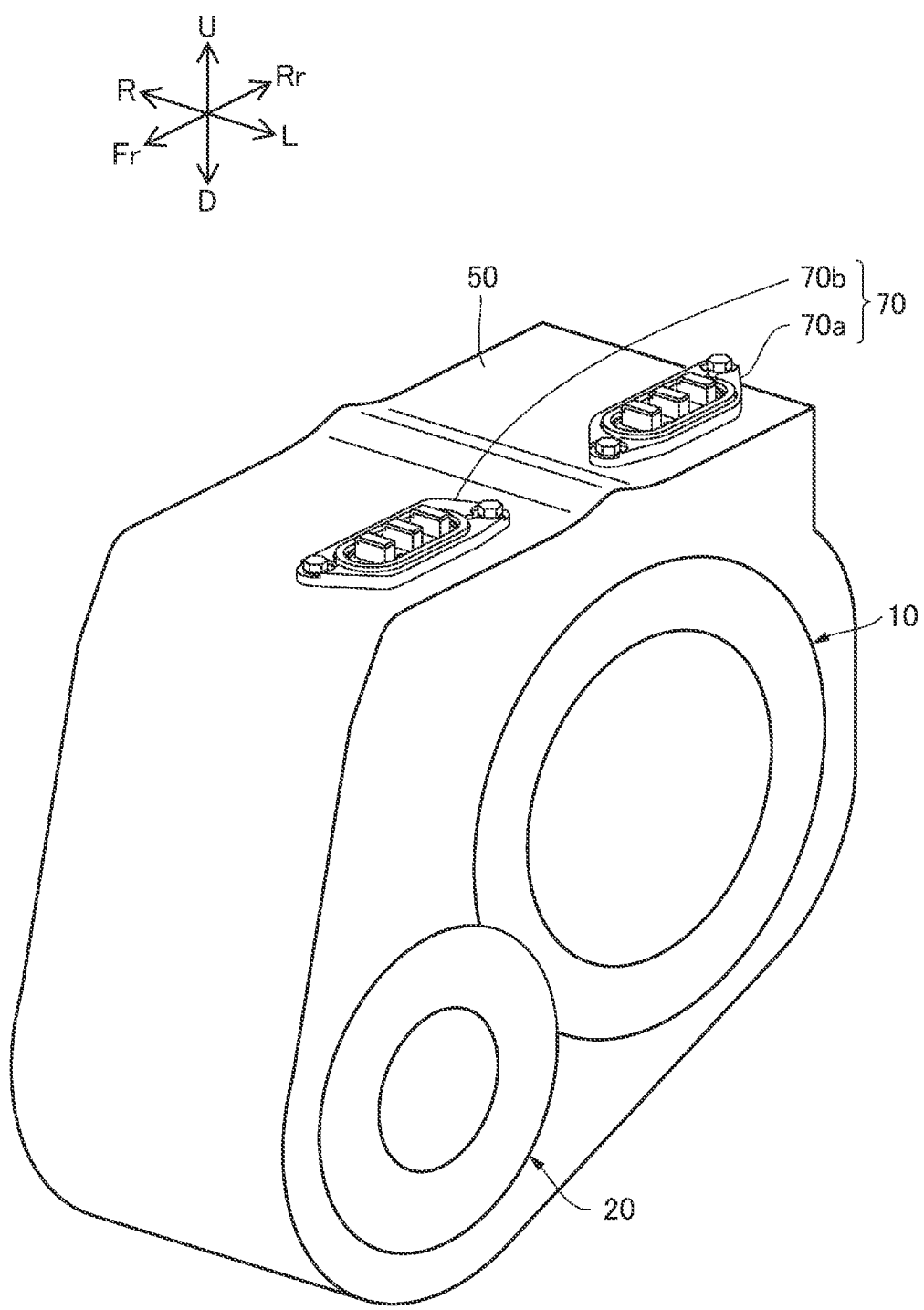
FIG. 4 is a perspective view of the drive unit 1 at the time when a PCU 40 and a PCU housing 60 are removed.

Next, the first rotary electric machine 10, the second rotary electric machine 20, and the PCU 40, which are provided in the drive unit 10, will be described with reference to FIGS. 3 to 5.

The first rotary electric machine 10 includes a rotor 11 and a stator 12 surrounding an outer periphery of the rotor 11. The stator 12 includes a stator core 13 and coils 14 of three phases (U phase, V phase, and W phase) mounted on the stator core 13. One ends of the coils 14 of the respective phases are connected, and the other ends (coil ends 14a) thereof are connected to coil connection terminals 72 of a first connector 70a described later.

The second rotary electric machine 20 includes a rotor 21 and a stator 22 surrounding an outer periphery of the rotor 21. The stator 22 includes a stator core 23 and coils 24 of three phases (U phase, V phase, and W phase) mounted on the stator core 23. One ends of the coils 24 of the respective phases are connected, and the other ends (coil ends 24a) thereof are connected to coil connection terminals 72 of a second connector 70b described later.

The first rotary electric machine 10 and the second rotary electric machine 20 are housed in a rotary electric machine housing 50. More specifically, the first rotary electric machine 10 and the second rotary electric machine 20 are housed in the rotary electric machine housing 50 such that respective rotary shaft X1 and rotary shaft X2 are parallel to each other. Here, the rotary shaft X1 and the rotary shaft X2 extend in a left-right direction (also referred to as an axial direction).

The second rotary electric machine 20 is disposed such that the rotary shaft X2 thereof is positioned at the lower side and the front side of the rotary shaft X1 of the first rotary electric machine 10 as viewed in the axial direction. The first rotary electric machine 10 and the second rotary electric machine 20 are disposed so as to partially overlap each other in an up-down direction and a front-rear direction. The first rotary electric machine 10 and the second rotary electric machine 20 are disposed so as to at least partially overlap each other in the left-right direction (axial direction).

As described above, the PCU 40 includes various components that control the first rotary electric machine 10 and the second rotary electric machine 20. The PCU 40 is housed in a PCU housing 60, and the PCU housing 60 is placed on an upper surface of the rotary electric machine housing 50.

The upper surface of the rotary electric machine housing 50 is inclined to the front side and the lower side at a predetermined inclination angle θ (for example, 5 degrees)

with respect to a horizontal surface. Accordingly, the PCU housing 60 is placed on the upper surface of the rotary electric machine housing 50 so as to be inclined to the front side and the lower side.

Figure 7:
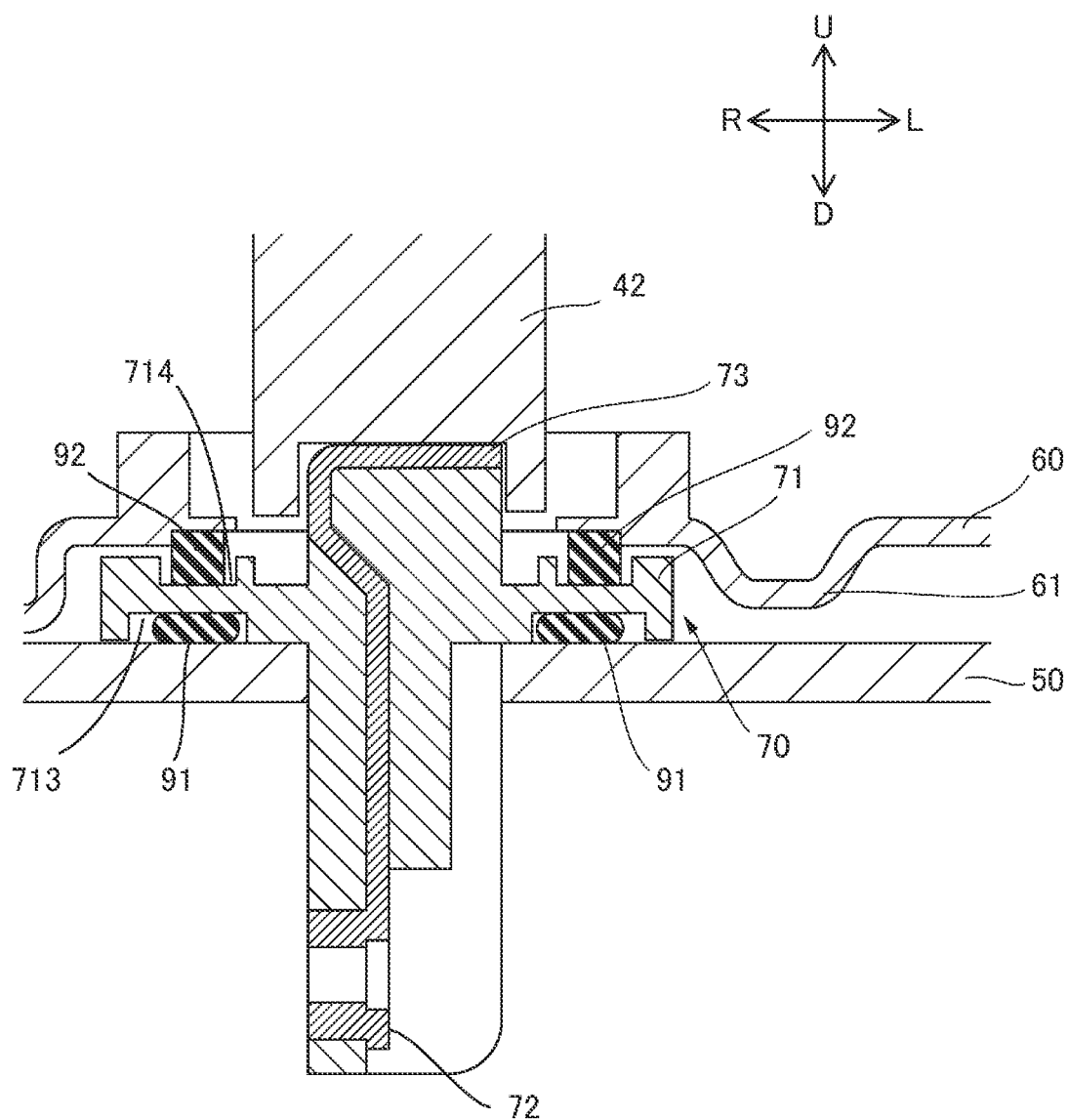
FIG. 7 is a cross-sectional view taken along a line A-A in FIG. 3.

A connector 70 that electrically connects the first rotary electric machine 10 and the second rotary electric machine 20 to the PCU 40 is provided on the upper surface of the rotary electric machine housing 50. As illustrated in FIG. 7, a lower portion of the PCU 40 is provided with a three-phase PCU side connector 42 exposed from an opening in a lower surface of the PCU housing 60. The connector 70 fits with the PCU side connector 42, and the first rotary electric machine 10 and the second rotary electric machine 20 are electrically connected to the PCU 40.

More specifically, the connector 70 includes the first connector 70a connected to the first rotary electric machine 10 and the second connector 70b connected to the second rotary electric machine 20. The first connector 70a and the second connector 70b are arranged side by side in the front-rear direction on the upper surface of the rotary electric machine housing 50 such that the first connector 70a is on the rear side and the second connector 70b is on the front side.

Figure 5:
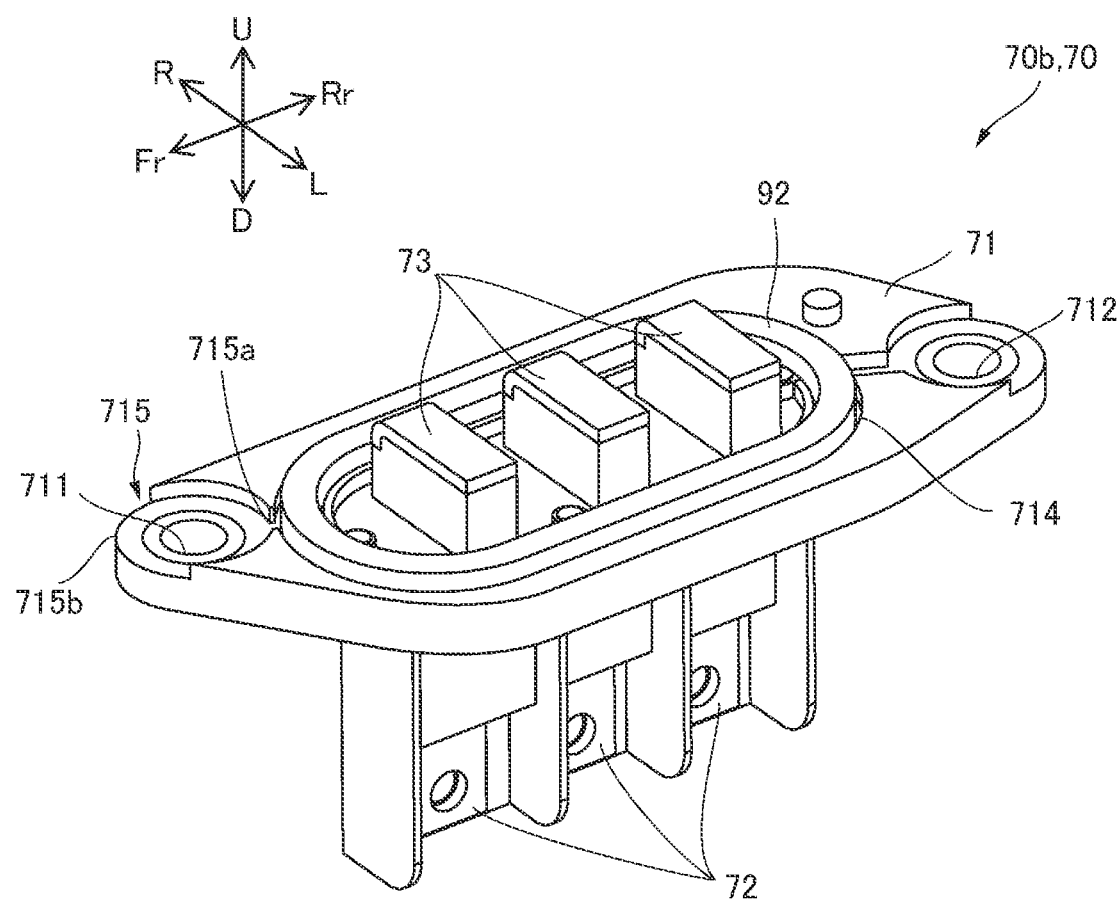
FIG. 5 is a perspective view of a connector 70.

FIG. 5 shows the second connector 70b. The second connector 70b includes a base portion 71, the three-phase (U phase, V phase, W phase) coil connection terminals 72 provided at the base portion 71, and three-phase (U phase, V phase, W phase) connector terminals 73 provided at the base portion 71.

The base portion 71 is a plate member extending in an inclined direction (front-rear direction) of the upper surface of the rotary electric machine housing 50. The base portion 71 is provided with an insertion hole 711 at a front end and an insertion hole 712 at a rear end, and is fixed to the upper surface of the rotary electric machine housing 50 by inserting bolts B or the like into the insertion holes 711 and 712. The coil connection terminals 72 are provided below the base portion 71 and are connected to the coil ends 24a of respective phases of the second rotary electric machine 20. The connector terminals 73 are electrically connected to the coil connection terminals 72, and are provided above the base portion 71. The connector terminals 73 are connected to the three-phase PCU side connector 42 provided at a front side of the lower portion of the PCU 40 by being fitted thereto. Accordingly, the second rotary electric machine 20 and the PCU 40 are electrically connected via the second connector 70b.

The first connector 70a has the same configuration as the second connector 70b. The coil connection terminals 72 of the first connector 70a are connected to the coil ends 14a of respective phases of the first rotary electric machine 10. The connector terminals 73 of the first connector 70a are fitted and connected to a three-phase PCU side connector terminal (not illustrated) provided at a rear side of the lower portion of the PCU 40. Accordingly, the first rotary electric machine 10 and the PCU 40 are electrically connected via the first connector 70a.

Sealing Structure for Connector

A liquid (for example, water droplets such as rainwater) may enter a gap between the upper surface of the rotary electric machine housing 50 and the lower surface of the PCU housing 60 from the outside. When the liquid makes an entry to be in contact with the coil connection terminal 72 or the connector terminal 73 of the connector 70, a short circuit may occur, leading to a failure. In order to prevent the liquid from making an entry to be in contact with the coil connection terminal 72 and the connector terminal 73, the connector 70 is provided with a sealing structure. Hereinafter, a sealing structure of the second connector 70b provided at the front side of the upper surface of the rotary electric machine housing 50 will be described. Note that the first connector 70a provided at the rear side has the same configuration. The second connector 70b is also simply referred to as the connector 70.

First, a sealing structure of the coil connection terminal 72 on the lower side of the base portion 71 will be described with reference to FIG. 7.

A lower seal groove 713 continuously surrounding the coil connection terminal 72 is provided on a lower surface of the base portion 71. A seal member 91 is disposed in the lower seal groove 713. The seal member 91 is, for example, an elastic member such as rubber.

When the connector 70 is fixed to the rotary electric machine housing 50, the seal member 91 comes into contact with the upper surface of the rotary electric machine housing 50 to seal the coil connection terminal 72. Accordingly, a liquid can be prevented from making an entry to be in contact with the coil connection terminal 72 from the outside.

Next, a sealing structure of the connector terminal 73 provided at the upper side of the base portion 71 will be described with reference to FIGS. 5 to 7.

Figure 6:
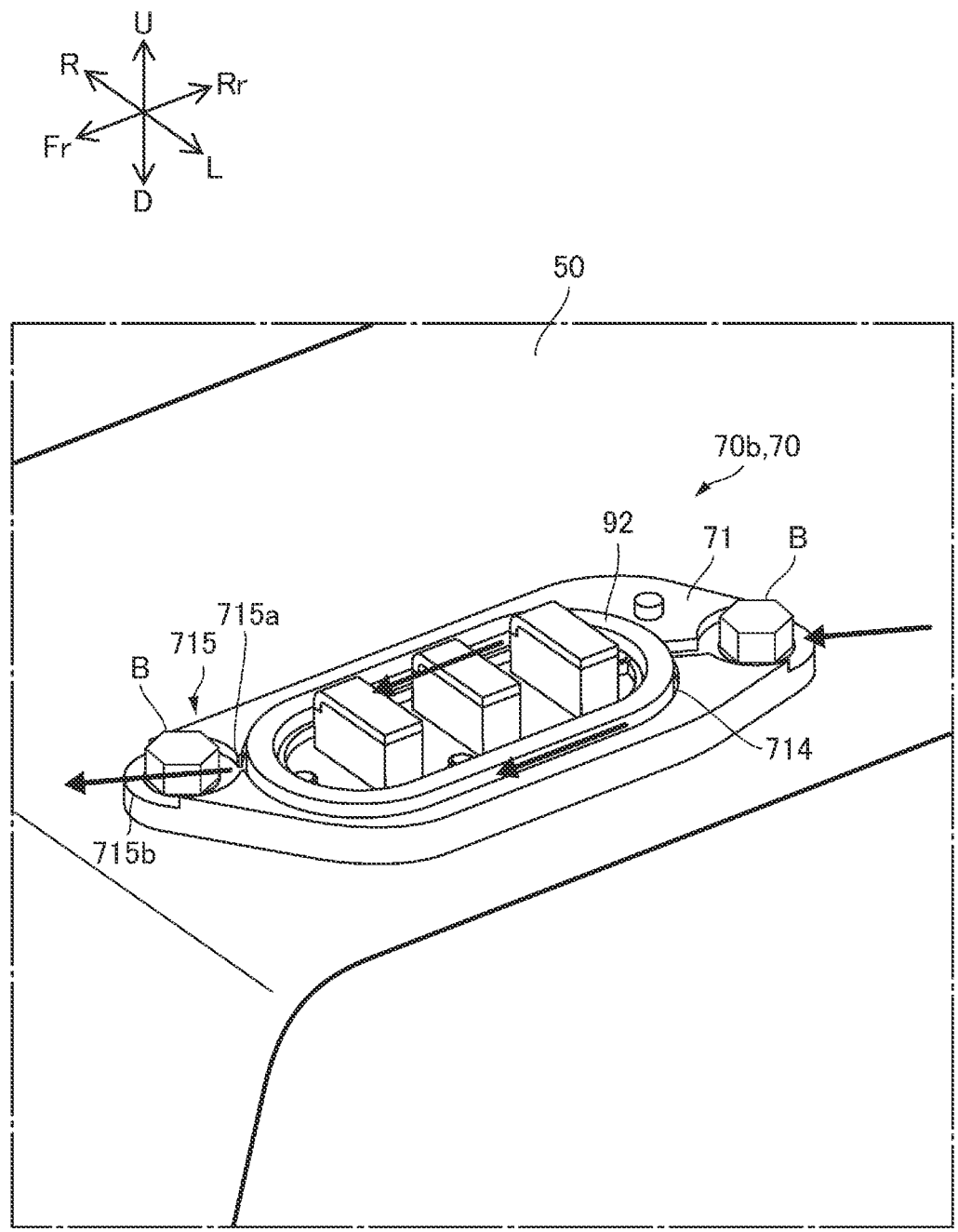
FIG. 6 is a view illustrating flow of a liquid flowing along an upper seal groove 714 of the connector 70.

As illustrated in FIGS. 5 and 6, an upper seal groove 714 continuously surrounding the connector terminal 73 is provided on an upper surface of the base portion 71. A seal member 92 is disposed in the upper seal groove 714. The seal member 92 is, for example, an elastic member such as rubber.

As illustrated in FIG. 7, when the connector 70 is connected to the PCU side connector 42, the seal member 92 comes into contact with the lower surface of the PCU housing 60 to seal the connector terminal 73. Accordingly, even when a liquid enters from the outside and flows in the upper seal groove 714, the liquid can be prevented from making an entry to be in contact with the connector terminal 73.

As illustrated in FIGS. 5 and 6, a discharge portion 715, which communicates with the upper seal groove 714 and from which the liquid flowing along the upper seal groove 714 is charged, is provided on the upper surface of the base portion 71. The discharge portion 715 is provided at the front end of the base portion 71 and has the insertion hole 711.

More specifically, the discharge portion 715 is a substantially circular recessed portion provided on the upper surface of the base portion 71. The discharge portion 715 is connected to a front end portion of the upper seal groove 714 at a communication portion 715a. At this time, as described above, the upper surface of the rotary electric machine housing 50 is inclined to the front side and the lower side with respect to the horizontal surface, and accordingly, the upper seal groove 714 provided in the connector 70 is also inclined to the front side and the lower side with respect to the horizontal surface. Thus, the front end portion of the upper seal groove 714 is a lower end portion of the upper seal groove 714. Accordingly, the communication portion 715a of the discharge portion 715 communicates with the lower end portion of the upper seal groove 714.

A front end edge 715b of the discharge portion 715 extends to a side surface of the base portion 71. Thus, the discharge portion 715 communicates with the side surface of the base portion 71 at the front end edge 715b. A depth of a bottom surface of the discharge portion 715 from the upper surface of the base portion 71 is the same as a depth of the upper seal groove 714 at the communication portion 715a from the upper surface of the base portion 71, or is greater than the depth of the upper seal groove 714 at the communication portion 715a from the upper surface of the base portion 71.

As described above, the upper seal groove 714 provided in the connector 70 is also inclined to the front side and the lower side with respect to the horizontal surface. Thus, a liquid entering the upper seal groove 714 flows smoothly along the upper seal groove 714 toward the front side and the lower side as illustrated in FIG. 6 (thick arrows indicating flow of the liquid). The liquid flowing to the lower end portion of the upper seal groove 714 is guided to the discharge portion 715 through the communication portion 715a. The liquid guided to the discharge portion 715 is discharged to the outside of the connector 70 from the insertion hole 711 and the front end edge 715b.

With such a configuration, it is possible to prevent the liquid from accumulating in the upper seal groove 714, and to secure sufficient sealing performance. Further, generation of rust due to accumulation of the liquid can be prevented, and degradation of a sealing function of the upper seal groove 714 and the seal member 92 can be prevented. Accordingly, waterproof performance of the connector 70 can be improved.

In addition, since the liquid is discharged from the insertion hole 711 that is the fixing portion for the connector 70 and the rotary electric machine housing 50 (that is, the discharge portion 715 has the insertion hole 711), the fixing portion can also be used as the discharge portion 715, and there is no need to separately provide a hole for discharging the liquid.

The connector 70 is also capable of discharging a liquid, which enters from the outside, through the insertion hole 712 provided at the rear end of the base portion 71. The liquid that cannot be completely discharged from the insertion hole 712 is guided to the upper seal groove 714 and can be discharged from the insertion hole 711 provided at the front end of the base portion 71.

As described above, the connector 70 is provided with the sealing structure for preventing a liquid from entering to be in contact with the coil connection terminals 72 and the connector terminals 73, and additionally the PCU housing 60 may also be provided with a sealing structure.

Specifically, as illustrated in FIG. 7, a protrusion 61 protruding to the lower side may be provided on the lower surface of the PCU housing 60. The protrusion 61 is provided at an outer peripheral side of the upper seal groove 714. The protrusion 61 protrudes to the lower side from a contact surface between the lower surface of the PCU housing 60 and the seal member 92.

With such a configuration, it is possible to prevent a liquid from splashing on the contact surface between the lower surface of the PCU housing 60 and the seal member 92, and to improve the waterproof performance of the connector 70.

Although one embodiment of the present invention has been described above with reference to the accompanying drawings, it goes without saying that the present invention is not limited to the embodiment. It is apparent that those skilled in the art can conceive various modifications and alterations within the scope described in the claims, and it is also understood that such modifications and alterations naturally fall within the technical scope of the present invention. In addition, the constituent elements in the above embodiment may be freely combined without departing from the spirit of the present invention.

In the above-described embodiment, the upper surface of the rotary electric machine housing 50 is inclined to the front side and the lower side with respect to the horizontal surface, and the upper seal groove 714 is also inclined to the front side and the lower side with respect to the horizontal surface, and the present invention is not limited thereto. For example, the upper surface of the rotary electric machine housing 50 may not be inclined. In this case, a portion of the connector 70 near the insertion hole 712 also corresponds to the discharge portion 715.

At least the following matters are described in the present specification. In the parentheses, corresponding constituent elements and the like in the above embodiment are shown as an example, and the present invention is not limited thereto.

(1) A drive unit (drive unit 1) including:
 a rotary electric machine (first rotary electric machine 10, second rotary electric machine 20);
 a first housing (rotary electric machine housing 50) that houses the rotary electric machine;
 an electric-power control device (PCU 40) that controls the rotary electric machine;
 a second housing (PCU housing 60) that is attached to an upper surface of the first housing and houses the electric-power control device; and
 a connector (connector 70) that has a connector terminal (connector terminal 73) for electrically connecting the rotary electric machine and the electric-power control device, and that is fixed to the upper surface of the first housing,
 in which the connector includes
  a base portion (base portion 71) that is fixed to the upper surface of the first housing,
  the connector terminal that is provided at the base portion,
  a seal groove (upper seal groove 714) that is provided in the base portion so as to surround the connector terminal and in which a seal member (seal member 92) is disposed, and
  a discharge portion (discharge portion 715) that communicates with the seal groove and from which a liquid flowing along the seal groove is discharged.

According to (1), the connector includes the seal groove in which the seal member is disposed, and the discharge portion from which a liquid flowing along the seal groove is discharged, and the discharge portion communicates with the seal groove. With such a configuration, it is possible to prevent the liquid from accumulating in the seal groove, and to secure sufficient sealing performance. Further, generation of rust due to the accumulation of the liquid can be prevented, and degradation of a sealing function of the seal groove and the seal member can be prevented. Accordingly, waterproof performance of the connector can be improved.

(2) The drive unit according to (1),
 in which the seal member is in contact with a lower surface of the second housing, and
 in which the second housing is provided with a protrusion (protrusion 61) protruding to a lower side from a contact surface between the lower surface of the second housing and the seal member.

According to (2), since the second housing is provided with the protrusion protruding to the lower side from the contact surface between the lower surface of the second housing and the seal member, a liquid is prevented from splashing on the contact surface, and the waterproof performance of the connector can be improved.

(3) The drive unit according to (1) or (2),
in which the base portion is provided with an insertion hole (insertion holes 711 and 712) through which a fixing member (bolt B) for fixing the connector to the first housing is inserted, and
in which the discharge portion includes the insertion hole.

According to (3), the insertion hole, which is a fixing portion of the connector and the first housing, can also be used as the discharge portion. Accordingly, it is not necessary to separately provide a hole for discharging the liquid.

(4) The drive unit according to (1) or (2),
in which the seal groove is provided to be inclined to a lower side, and
in which the discharge portion communicates with a lower end of the seal groove.

According to (4), since the seal groove is provided to be inclined to the lower side and the discharge portion communicates with the lower end of the seal groove, a liquid entering the seal groove can smoothly flow from the discharge portion toward the lower side.

(5) The drive unit according to (3),
in which the seal groove is provided to be inclined to a lower side, and
in which the discharge portion communicates with a lower end of the seal groove.

According to (5), since the seal groove is provided to be inclined to the lower side and the discharge portion communicates with the lower end of the seal groove, a liquid entering the seal groove can smoothly flow from the discharge portion toward the lower side.

What is claimed is:

1. A drive unit comprising:
a rotary electric machine;
a first housing that houses the rotary electric machine;
an electric-power control device that controls the rotary electric machine;
a second housing that is attached to an upper surface of the first housing and houses the electric-power control device; and
a connector that has a connector terminal for electrically connecting the rotary electric machine and the electric-power control device, and that is fixed to the upper surface of the first housing,
wherein the connector includes
a base portion that is fixed to the upper surface of the first housing,
the connector terminal that is provided at the base portion,
a seal groove that is provided in the base portion so as to surround the connector terminal and in which a seal member is disposed, and
a discharge portion that communicates with the seal groove and from which a liquid flowing along the seal groove is discharged,
wherein the discharge portion has an insertion hole through which a fixing member for fixing the connector to the first housing is inserted, and
wherein a communication portion communicating between the seal groove and the discharge portion is provided between the insertion hole and the seal groove.

2. The drive unit according to claim 1,
wherein the seal member is in contact with a lower surface of the second housing, and
wherein the second housing is provided with a protrusion protruding to a lower side from a contact surface between the lower surface of the second housing and the seal member.

3. The drive unit according to claim 1,
wherein the seal groove is provided to be inclined to a lower side, and
wherein the discharge portion communicates with a lower end of the seal groove.

4. A drive unit comprising:
a rotary electric machine;
a first housing that houses the rotary electric machine;
an electric-power control device that controls the rotary electric machine;
a second housing that is attached to an upper surface of the first housing and houses the electric-power control device; and
a connector that has a connector terminal for electrically connecting the rotary electric machine and the electric-power control device, and that is fixed to the upper surface of the first housing,
wherein the connector includes
a base portion that is fixed to the upper surface of the first housing,
the connector terminal that is provided at the base portion,
a seal groove that is provided in the base portion so as to surround the connector terminal and in which a seal member is disposed, and
a discharge portion that communicates with the seal groove and from which a liquid flowing along the seal groove is discharged,
wherein the second housing is provided with a protrusion protruding to a lower side from an upper surface of the seal member, and
wherein the protrusion is provided at an outer peripheral side of the seal groove.

5. The drive unit according to claim 4,
wherein the base portion is provided with an insertion hole through which a fixing member for fixing the connector to the first housing is inserted, and
wherein the discharge portion includes the insertion hole.

6. The drive unit according to claim 4,
wherein the seal groove is provided to be inclined to a lower side, and
wherein the discharge portion communicates with a lower end of the seal groove.

7. The drive unit according to claim 5,
wherein the seal groove is provided to be inclined to a lower side, and
wherein the discharge portion communicates with a lower end of the seal groove.

* * * * *